United States Patent
Hainz et al.

(10) Patent No.: US 11,049,387 B2
(45) Date of Patent: Jun. 29, 2021

(54) APPARATUSES FOR ENCODING AND DECODING WHEEL SPEED SENSOR SIGNALS AND METHODS FOR COMMUNICATING ENCODED WHEEL SPEED SENSOR SIGNALS

(71) Applicant: Infineon Technologies AG, Neubiberg (DE)

(72) Inventors: Simon Hainz, Villach (AT); Robert Hermann, Voelkermarkt (AT)

(73) Assignee: Infineon Technologies AG, Neubiberg (DE)

( * ) Notice: Subject to any disclaimer, the term of this patent is extended or adjusted under 35 U.S.C. 154(b) by 357 days.

(21) Appl. No.: 15/844,672

(22) Filed: Dec. 18, 2017

(65) Prior Publication Data

US 2018/0174441 A1 Jun. 21, 2018

(30) Foreign Application Priority Data

Dec. 21, 2016 (DE) .......................... 102016125183.6

(51) Int. Cl.
*G08C 19/16* (2006.01)
*G01M 17/013* (2006.01)
(Continued)

(52) U.S. Cl.
CPC .......... *G08C 19/16* (2013.01); *G01M 17/013* (2013.01); *G01P 3/487* (2013.01); *G01P 3/489* (2013.01)

(58) Field of Classification Search
CPC ...... G08C 19/16; G01M 17/013; G01P 3/487; G01P 3/489; G01P 3/481
See application file for complete search history.

(56) References Cited

U.S. PATENT DOCUMENTS 6,339,322 B1 1/2002 Loreck et al.
6,542,847 B1 4/2003 Lohberg et al.
(Continued)

FOREIGN PATENT DOCUMENTS

CN 103236902 A 8/2013
CN 103795465 A 5/2014
(Continued)

OTHER PUBLICATIONS

Hafner et al., Daimler AG "Requirement Specifications for Standardized Interface for Wheel Speed Sensors with Additional" ("AK-Protokoll"), V. 4.0 (English), Feb. 13, 2008, 35 pages.
(Continued)

*Primary Examiner* — Toan M Le
*Assistant Examiner* — Xiuqin Sun
(74) *Attorney, Agent, or Firm* — Harrity & Harrity, LLP

(57) ABSTRACT

A signal encoder for encoding a wheel speed sensor signal includes an input interface. The input interface is configured to receive a wheel speed sensor signal providing speed information and additional information. Furthermore, the signal encoder includes a signal processing circuit. The signal processing circuit is configured to generate a first and a second speed pulse. A time interval between the first and the second speed pulse corresponds to the speed information. Additionally, the signal processing circuit is configured to generate a data pulse between the first and the second speed pulse based on the additional information. The generation of the data pulse is in in accordance with a modulation scheme having a modulation order of at least three. Furthermore, the signal encoder includes an output interface. The output interface is configured to sequentially output the first speed pulse, the data pulse, and the second speed pulse.

20 Claims, 6 Drawing Sheets

(51) Int. Cl.
*G01P 3/487* (2006.01)
*G01P 3/489* (2006.01)

(56) References Cited

U.S. PATENT DOCUMENTS

| | | |
|---|---|---|
| 6,653,968 B1 | 11/2003 | Schneider |
| 6,687,644 B1 | 2/2004 | Zinke et al. |
| 9,212,908 B2 | 12/2015 | Geen et al. |
| 2006/0139158 A1 | 6/2006 | Miller et al. |
| 2014/0210641 A1 | 7/2014 | Hammerschmidt |
| 2015/0268263 A1 | 9/2015 | Rasbornig |
| 2016/0004585 A1 | 1/2016 | Slama et al. |
| 2016/0142080 A1 | 5/2016 | Hammerschmidt |
| 2016/0231141 A1 | 8/2016 | Endres et al. |

FOREIGN PATENT DOCUMENTS

| | | |
|---|---|---|
| CN | 103968861 A | 8/2014 |
| CN | 104931718 A | 9/2015 |
| CN | 105610452 A | 5/2016 |
| CN | 104181325 B | 8/2016 |
| DE | 19634715 | 3/1998 |
| DE | 19650935 | 6/1998 |
| DE | 19911774 | 12/1999 |
| DE | 10345728 | 4/2005 |
| DE | 102005015822 A1 | 10/2006 |
| DE | 102014100994 | 7/2014 |
| DE | 102013015575 | 3/2015 |
| DE | 102015103614 | 9/2015 |
| DE | 102014216295 A1 | 2/2016 |
| DE | 102014116909 | 5/2016 |
| SU | 672567 A1 | 7/1979 |
| WO | 2017131934 A1 | 8/2017 |

OTHER PUBLICATIONS

Wang H., et al., "Simulation Research on Influence of Sensor Vibration on Diesel Engine Transient Speed Measurement", Electromechanical Engineering Technology, Dec. 31, 2014, 4 pages.

APPARATUSES FOR ENCODING AND DECODING WHEEL SPEED SENSOR SIGNALS AND METHODS FOR COMMUNICATING ENCODED WHEEL SPEED SENSOR SIGNALS

RELATED APPLICATION

This application claims priority under 35 U.S.C. § 119 to German Patent Application No. 102016125183.6, filed on Dec. 21, 2016, the contents of which are incorporated by reference herein in their entirety.

TECHNICAL FIELD

Examples relate to signal encoders for encoding and to signal decoders for decoding wheel speed sensor signals. Moreover, examples relate to methods for communicating encoded wheel speed sensor signals.

BACKGROUND

Over the past years, significant advances have been made in the area of automated monitoring of the operation of machines. One is often interested in measuring and monitoring the speed of a wheel, a gear wheel or a shaft of, for example, a vehicle. This information is crucial for control systems of the machine, for example, for an antilock braking system or an electronic stability program of a vehicle. Modern sensors, installed at various sites of the machine, deliver an increasing amount of data related to their measurements. This data is frequently sent to a central control unit such as an electronic control unit of a vehicle. The increasing amount of sensor data calls for novel data transmission concepts that can provide a reliable communication of the sensor data at higher data rates.

Such a demand can be satisfied by the subject matter of the present disclosure.

SUMMARY

According to a first aspect of the present disclosure, it is provided a signal encoder for encoding a wheel speed sensor signal. The signal encoder comprises an input interface. The input interface is configured to receive a wheel speed sensor signal providing speed information and additional information. Furthermore, the signal encoder comprises a signal processing circuit. The signal processing circuit is configured to generate a first and a second speed pulse. A time interval between the first and the second speed pulse corresponds to the speed information. Additionally, the signal processing circuit is configured to generate a data pulse between the first and the second speed pulse based on the additional information. The generation of the data pulse is in in accordance with a modulation scheme having a modulation order of at least three. Furthermore, the signal encoder comprises an output interface. The output interface is configured to sequentially output the first speed pulse, the data pulse, and the second speed pulse.

According to a second aspect of the present disclosure, it is provided a signal decoder for decoding a wheel speed sensor signal. The signal decoder comprises an input interface. The input interface is configured to receive an encoded wheel speed sensor signal. The encoded wheel speed sensor signal provides speed information and additional information. Furthermore, the signal decoder comprises a signal processing circuit. The signal processing circuit is configured to determine the speed information based on a time interval between a first and a second speed pulse of the encoded wheel speed sensor signal. Additionally, the signal processing circuit is configured to determine the additional information based on a data pulse received between the first and the second speed pulse. The determination of the additional information is in accordance with a modulation scheme of the data pulse having a modulation order of at least three. Furthermore, the signal decoder comprises an output interface configured to provide the decoded speed information and the decoded additional information.

According to a third aspect of the present disclosure, it is provided a method for communicating an encoded wheel speed sensor signal. The method comprises providing a first and a second speed pulse. A time interval between the first and the second speed pulse corresponds to speed information of a wheel speed sensor. Furthermore, the method comprises providing a data pulse between the first and the second speed pulse in accordance with a modulation scheme having a modulation order of at least three. The data pulse is based on additional information of the wheel speed sensor.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
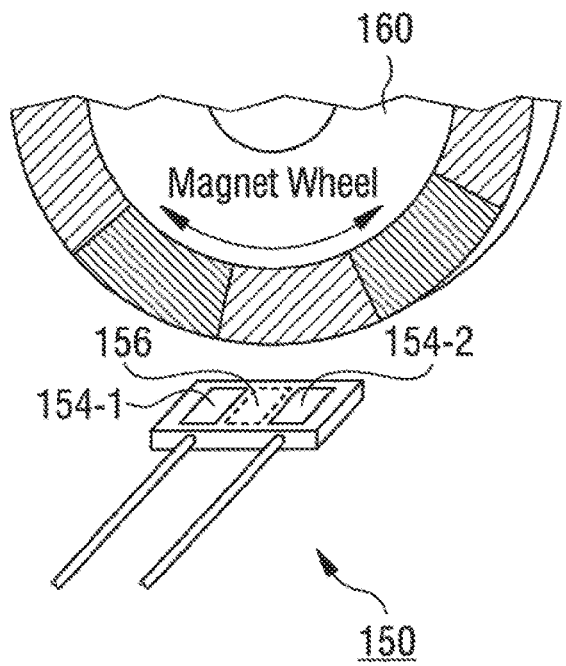
FIG. 1A shows a setup for magnetic incremental speed sensing.

FIG. 1A shows a setup for magnetic incremental speed sensing. In this example, a magnetic wheel speed sensor 150 is used to detect the speed of a rotatably movable magnetic encoder wheel (magnetic pole wheel) 160 comprising alternating magnetic poles (increments) in circumferential direction. The encoder wheel 160 can, for instance, be fixed on a wheel of a vehicle and/or on a shaft of an engine of a vehicle. The magnetic wheel speed sensor 150 comprises first and second magnetic sensor elements 154-1, 154-2 to sense variations of the magnetic field originating from the rotating encoder wheel 160. Examples of magnetic sensor elements are Hall sensor or magneto-resistive sensor elements. A signal processing circuitry 156 may further process the signals provided by the magnetic sensor elements 154-1, 154-2. For example, the signal processing circuitry 156 may generate additional information beside speed information of the encoder wheel 160. For example, the additional information can comprise a rotational direction of the encoder wheel 160 that can be derived by the differential setup of the magnetic sensor elements 154-1, 154-2. Furthermore, the additional information can comprise error information, for example, validity of the rotational direction information. This error information can indicate an inadequate detection situation in the magnetic wheel speed sensor 150. The additional information can also comprise information of an air gap reserve between the encoder wheel 160 and the magnetic wheel speed sensor 150. The air gap reserve information can, for example, indicate the distance between the encoder wheel and magnetic wheel speed sensor. This information can also be implemented with one bit information, e.g., with a warning if a distance between the encoder wheel and the magnetic wheel speed sensor 150 becoming too large. The additional information can also comprise information of the chip temperature (e.g., the temperature of the magnetic wheel speed sensor).

In other embodiments the rotating wheel can be a toothed wheel instead of the pole wheel. In such an embodiment, a permanent magnet (e.g., placed on the backside of the wheel speed sensor 150) generates a static magnetic field which is influenced by the rotating toothed wheel. The modulation of the magnetic field is then measured by the wheel speed sensor 150.

Other wheel speed sensors can be based on radio waves. For example, a radar wheel speed sensor may monitor an encoder wheel by transmitting radar waves towards the encoder wheel and receiving reflections of the radar waves from the encoder wheel. To this end, the encoder wheel can comprise areas of alternating reflectivity or alternating distance from the sensor in circumferential direction.

Figure 1B:
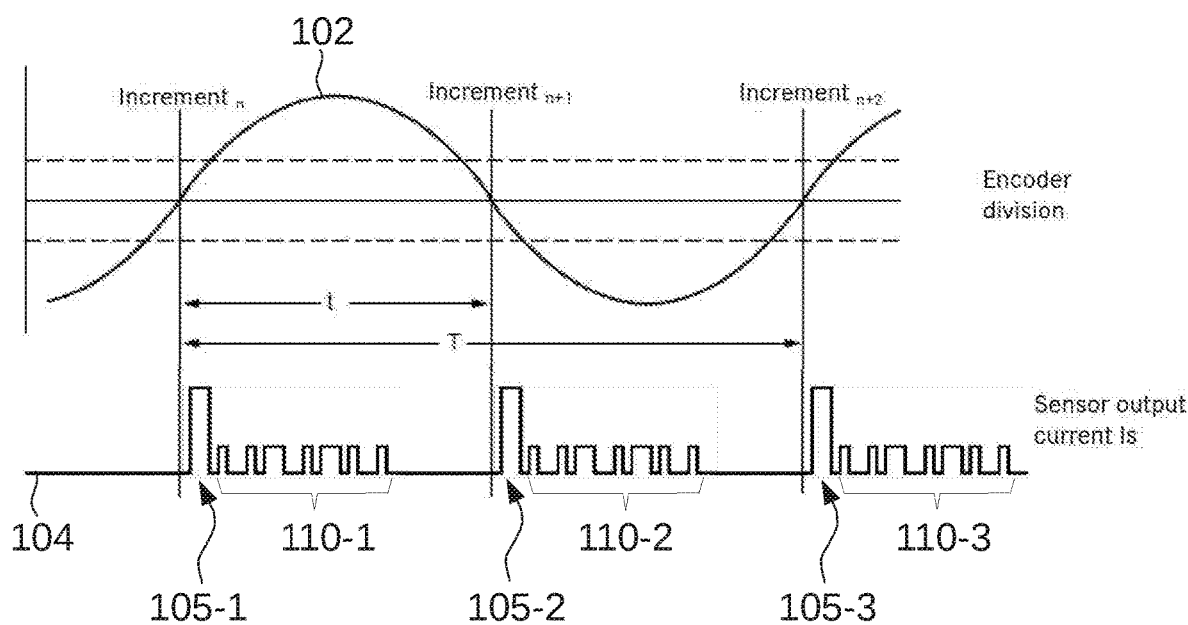
FIG. 1B shows a waveform of a raw wheel speed sensor signal (WSS signal) and a waveform of an encoded WSS signal.

FIG. 1B shows a waveform of a raw wheel speed sensor signal 102 (WSS signal) and a waveform of an encoded WSS signal 104. For example, the raw WSS signal can be provided by the magnetic wheel speed sensor 150 of FIG. 1A. A zero crossing of the raw WSS signal 102 can occur each time a magnetic pole of the encoder wheel 160 passes the first and second magnetic sensor elements 154-1, 154-2. A time interval t between two zero crossings (or a time interval T between two points of equal phase of the raw WSS signal) can hence be indicative for the (rotational) speed of the encoder wheel and thus also for the speed of a wheel or a shaft the encoder wheel is attached to, for example. In other words, the frequency of the raw WSS signal 102 can be indicative for the (rotational) speed of the encoder wheel.

A signal encoder can encode the raw WSS signal 102 and combine it with additional information provided by a wheel speed sensor. For example, the signal encoder can be configured to generate a speed pulse (e.g., speed pulse 105-1, 105-2, 105-3) at each zero crossing of the raw WSS signal 102. A time interval between two successive speed pulses (or the pulse repetition frequency of the speed pulses) can hence correspond to the speed information delivered by the raw WSS signal 102. Using speed pulses 105-1, 105-2, 105-3 to express the speed information rather than the raw WSS signal 102 itself can make the communication of the speed information to circuit remote to the wheel speed sensor more robust against interfering signals and/or noise.

In between two successive speed pulses, the signal encoder can be configured to generate sequences of data pulses 110-1, 110-2, 110-3 carrying the additional information (e.g., rotational direction, error, and/or air gap reserve information).

Figure 1C:
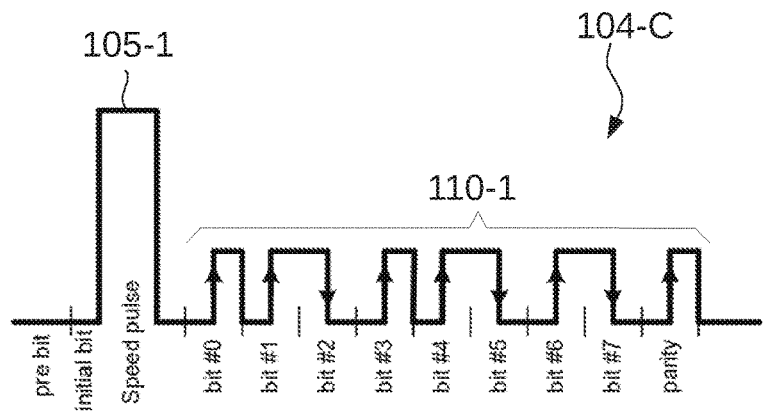
FIG. 1C illustrates a waveform of a Manchester encoded WSS signal.

FIG. 1C illustrates a waveform of an encoded WSS signal 104-C. The waveform 104-C of the encoded WSS signal can be used in a communication protocol used for transmission and reception of WSS signals in vehicles. This protocol can, for example, be used in the field of functional safety ABS systems (antilock braking systems). The protocol can allow delivering speed information as well as additional information (e.g., error bits). A speed pulse 105-1 of the of an encoded WSS signal 104-C can be a 28 mA pulse. The speed pulse 105-1 is followed by 9 serial data bits (e.g., a sequence of data pulses 110-1) of the encoded WSS signal 104-C. The data bits (e.g., the data pulses) are coded binary by a Manchester code with the current levels of 7 mA and 14 mA.

Furthermore, a pre bit and an initial bit precede the speed pulse 105-1. The pre bit can be the last data pulse of a previously generated sequence of data pulses. The initial bit may correspond to a pause interval preceding the speed pulse, where the level (e.g., the current and/or voltage level) of the waveform is minimal (e.g., at 7 mA).

However, in this protocol the additional information may be available for quite low (pulse repetition) frequencies of the speed pulses. As the speed of the encoder wheel increases, the frequency of the speed pulses may increase. Hence, the time interval between two successive speed pulses may shorten. This can decrease the available time for providing the data pulses. It might hence not be possible anymore to transmit all of the data pulses necessary for providing the additional information. Otherwise, a speed pulse could interfere with a data pulse and falsify data carried by this data pulse.

Figure 1D:
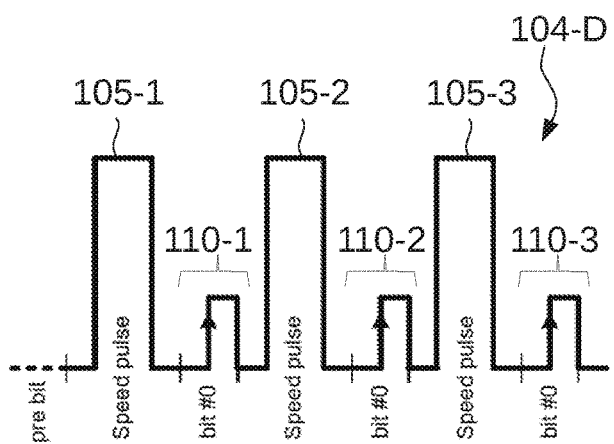
FIG. 1D illustrates a waveform of a Manchester encoded WSS signal with closely spaced speed pulses.

For example, the data bit #8 (e.g., parity) and #0 can only be delivered up to 2.1 kHz and 8 kHz, respectively. This can mean, that the error bit (e.g., bit #0) can be only available below 8 kHz and additional information only below 2.1 kHz. Those frequencies may be too low for transmission applications with maximum frequencies of 16 kHz and the trend of reaching higher frequencies. A waveform 104-D of a Manchester encoded WSS signal with a frequency of the speed pulses being 6.6 kHz is shown in FIG. 1D. At 6.6 kHz only speed information as well as the bit #0 (e.g., the error bit) can be delivered.

Hence, there is a demand for improving the encoding of speed information and additional information in terms of data rates and reliability. For example, it is desired to provide all additional information or at least more of the additional information between two speed pulses even when the time interval between successive speed pulses is very short (e.g., less than 550 µs).

Figure 2:
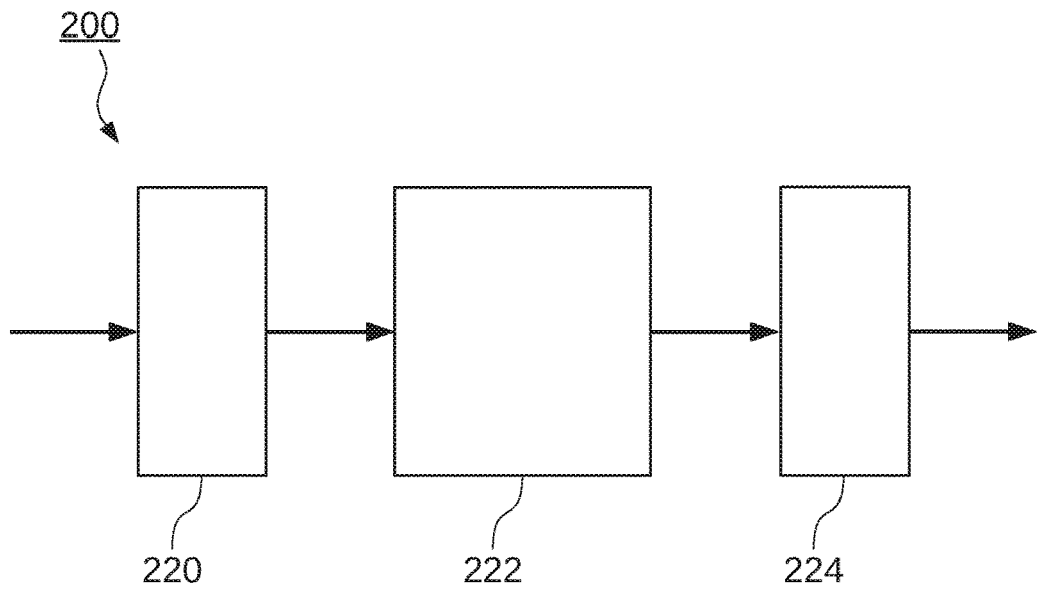
FIG. 2 shows a block diagram of a signal encoder for encoding a wheel speed sensor signal.

FIG. 2 shows a block diagram of a signal encoder 200 for encoding a wheel speed sensor signal. The signal encoder 200 comprises an input interface 220. The input interface 220 is configured to receive a wheel speed sensor signal providing speed information and additional information. Furthermore, the signal encoder 200 comprises a signal processing circuit 222. The signal processing circuit 222 is configured to generate a first and a second speed pulse. A time interval between the first and the second speed pulse corresponds to the speed information. Additionally, the signal processing circuit 222 is configured to generate a data pulse between the first and the second speed pulse based on the additional information. The generation of the data pulse is in in accordance with a modulation scheme having a modulation order of at least three. Furthermore, the signal encoder 200 comprises an output interface 224. The output interface 224 is configured to sequentially output the first speed pulse, the data pulse, and the second speed pulse.

By generating the data pulse in accordance with a modulation scheme having a modulation order of at least three, a higher amount (e.g., a higher share) of the additional information may be carried by the data pulse. For example, a Manchester encoded data pulse may only carry one bit of information. A modulation order m of the data pulse of at least three (e.g., m=3, m=4, m=8, m=16) can however enable the data pulse to carry more than 1 bit (or to carry at least more than one bit on average). In this way, a total number of data pulses generated between the first and the second speed pulse can be reduced. As there can be less data pulses, the time interval between the first and the second speed pulse can be smaller without causing interference between the second speed pulse and the data pulse (or a data pulse of a sequence of data pulses generated between the first and the second speed pulse). Hence, the data rate of the additional information can be maintained and/or increased while providing a reliable communication of the speed and additional information.

When the output interface 224 sequentially outputs the first speed pulse, the data pulse, and the second speed pulse, the second speed pulse may be followed by another data pulse that may represent more and/or updated additional information.

The signal processing circuit 222 can be configured to provide at most one rising edge and at most one falling edge to the data pulse. For example, the signal processing circuit 222 can be configured to provide a rectangular pulse shape, a triangular pulse shape, a Gaussian pulse shape, and/or a trapezoidal pulse shape to the data pulse. This can additionally increase the robustness of the communication of the additional information.

Moreover, the signal processing circuit 222 can be configured to generate the data pulse without delay after the first speed pulse. In this way, the time interval between the first and the second speed pulse can become shorter without causing interference with the data pulse (or with a data pulse of a sequence of data pulses generated between the first and the second speed pulse).

The signal processing circuit 222 can be configured to represent the additional information as a binary word of at least two bits. In some examples, the signal processing circuit 222 can be configured to represent the additional information according to a modulation scheme with a modulation order of at least 3 (e.g., 1.5 bits). In some of the examples herein the use of a digital implementation with a binary word of at least two bits is used for better illustration. For example, the signal processing circuit 222 may already receive the additional in-formation in form of bits from a wheel speed sensor. Alternatively, the signal processing circuit 222 can be configured to derive the additional information from a raw WSS signal provided by the wheel speed sensor and to then represent the derived additional information as a binary word of at least two bits.

For example, the signal processing circuit 222 can derive rotational direction information based on a raw WSS signal from a differential setup of sensor elements. The rotational direction can then be represented by one bit with a logic zero expressing one rotational direction (e.g., clockwise or forward direction) and a logic one expressing the opposite rotational direction (e.g., counterclockwise or backward direction), or vice versa.

In case of an inadequate (e.g., too weak or distorted) raw WSS signal, the signal processing circuit 222 can derive validity of rotational direction information as additional information and represent this information by an additional bit of the binary word. This bit can be at logic one when the rotational direction information is valid and at logic zero when the rotational direction information is invalid (or vice versa).

Furthermore, the signal processing circuit 222 can be configured to derive air gap reserve information as additional information and represent the air gap reserve information by an additional bit of the binary word. For example, a small amplitude of the raw WSS signal (e.g., falling below a predefined threshold) can be indicative for the air gap between the sensor elements and an encoder wheel having become too large. The signal processing circuit 222 may then set the bit expressing the air gap reserve information to logic one, for example. Additionally, the signal processing circuit 222 can be configured to provide a parity bit to the binary word. The signal processing circuit 222 may set the parity bit in such a manner that the binary word has even parity, for example.

The signal processing circuit 222 can be configured to generate the data pulse with a pulse shape corresponding to a value of more than one bit (e.g., 1.5 bits, two bits, three bits, four bits, and/or more) of the binary word. For example, if the binary word comprises two bits, the modulation order may be equal to four. A first pulse shape of the data pulse (e.g., a first modulation symbol of the modulation scheme)

may then correspond to the value "00", a second pulse shape (e.g., a second modulation symbol) to the value "01", a third pulse shape (e.g., a third modulation symbol) to the value "10", and a fourth pulse shape (e.g., a fourth modulation symbol) to the value "11" of the binary word. A single data pulse may thus carry the whole binary word. If the binary word comprises more than two bits, the modulation order may be increased accordingly. For example, when the binary word comprises four bits, the signal processing circuit 222 may generate the data pulse according to a modulation scheme with a modulation order of sixteen. In this case, the data pulse can have sixteen different pulse shapes according to the value of the four bit long binary word.

Additionally, the signal processing circuit 222 can be configured to generate a plurality of data pulses (e.g., a sequence of data pulses) between the first and the second speed pulse with each data pulse carrying at least more than one bit (e.g., 1.5 bits, two bits, three bits, four bits, and/or more) of the binary word. This can avoid the signal processing circuit 222 using a too high modulation order (e.g., higher than 16 or higher than 64). With a moderate modulation order of, for example, 3, 4, 8, and/or 16, the data pulses can be more robust against distortions, noise and/or interference of spurious signals (caused by other electronic equipment of a vehicle that employs the signal encoder 200, for example). In this way, the bits of the binary word representing the additional information can be allocated to different data pulses with each data pulse carrying more than 1 bit (e.g., 1.5 bit, two bits, three bits, and/or four bits).

According to an embodiment, the signal processing circuit 222 is configured to divide the binary word into at a plurality of bit segments. Each bit segment can comprise at least 1.5 bits (e.g., 1.5 bits, two bits, three bits, four bits, and/or more). In addition, the signal processing circuit 222 can be configured to generate a plurality of data pulses between the first and the second speed pulse. Each data pulse can then correspond to a respective bit segment. The pulse shape of each data pulse can depend on a value of its corresponding bit segment.

The signal processing circuit 222 can be configured to adjust the number of data pulses generated between the first and the second speed pulse according to the time interval between the first and the second speed pulse. For example, the signal processing circuit 222 can be configured to estimate and/or to predict the time interval between the first and the second speed pulse based on an evaluation of a time interval between two previously generated speed pulses. To this end, the time interval(s) between previously generated speed pulses can be stored in a memory of the signal processing circuit 222 and be looked up for predicting the next time interval between two successive speed pulses. After having estimated the (available) time interval between the first and the second speed pulse, the signal processing circuit 222 can determine and adjust the number of data pulses that can be transmitted in this time interval. Adjusting the number of data pulses generated between the first and the second speed pulse can then avoid interference between data pulses and the second speed pulse. In another example each speed pulse is initiated with a pre-bit.

In some embodiments, the signal processing circuit 222 can be configured to introduce a pause interval between two successive data pulses. The pause interval can, for example, have a duration of less than a (maximal) pulse width of a data pulse (e.g., less than 75% of the pulse width, or less than 50% of the pulse width, or less than 25% of the pulse width) and/or more than 10% of the pulse width. Introducing a pause interval between two successive data pulses can make the encoded WSS signal more robust against distortion, dispersion and/or intersymbol interference.

The signal processing circuit 222 can be configured to set an amplitude of the data pulse to one of at least three different levels (e.g., three, four, eight, or sixteen different levels). Each level can correspond to a different modulation symbol of the modulation scheme. These different levels can be different current or voltage levels.

For example, the signal processing circuit 222 can be configured to set the amplitude of a data pulse to one of four different current levels in order to assign one of four modulation symbols to the data pulse. Because there are four different modulation symbols, each modulation symbol can represent two bits of the binary word of the additional information. For instance, a first current level of a fixed, predetermined value between 7 mA and 10 mA can correspond to a first modulation symbol. A second current level of a fixed, predetermined value between 10 mA and 13 mA can correspond to a second modulation symbol. A third current level of a fixed, predetermined value between 13 mA and 16 mA can correspond to a third modulation symbol, and a fourth current level of a fixed, predetermined value between 16 mA and 19 mA can correspond to a fourth modulation symbol. Of course, also other amplitude levels are possible for representing different and/or more modulation symbols.

Furthermore, the signal processing circuit 222 can be configured to set an amplitude of the first and the second speed pulse to a fixed level and to set the amplitude of the data pulse to a level at least smaller than 95% (or smaller than 90%, or smaller than 80%, or smaller than 50%) of the amplitude of the first and the second speed pulse. This can make the speed pulses to be distinguishable from a data pulse (e.g., from data pulse(s) of differing amplitudes for representing different modulation symbols). In the example above, the signal processing circuit 222 can be configured to set the amplitude of the first and the second speed pulse to a fixed value between 22.4 mA and 33.6 mA, for instance, to 28 mA.

Herein, the amplitude of a speed pulse and/or a data pulse can be defined as the maximum current or voltage of the pulse.

According to some examples, the signal processing circuit 222 can be configured to set the width of the data pulse to at least three different durations (e.g., three, four, eight, or sixteen different durations). Each duration can correspond to a different modulation symbol of the modulation scheme. In this way, the modulation order of the modulation scheme can be at least three, so that a data pulse can carry more than one bit of the binary word representing the additional information. Herein, the width of a data pulse can be defined as the full width at half maximum of the pulse.

For setting the width of the data pulse to different durations and in order to distinguish these different durations from each other, a variable pause may follow (or precede) the data pulse (or each data pulse in a sequence of data pulses). The shorter the duration of the data pulse, the longer the pause may be, so that in summation the duration of the data pulse and the duration of the pause may be constant. During the pulse, the output interface 224 can output a higher current (or voltage) than during the pause (or vice versa).

For example, the signal processing circuit 222 can be configured to set the width of a data pulse to one of four different durations in order to assign one of four modulation symbols to the data pulse. Because there are four different modulation symbols, each modulation symbol can represent two bits of the binary word of the additional information.

For instance, the sum of the duration of a data pulse and the duration of a pause (following or preceding the data pulse) may be 50 µs. A first duration of the data pulse may have a fixed value between 0 and 12.5 µs and can correspond to a first modulation symbol. In turn, the duration of a first pause corresponding to the first modulation symbol may have a fixed duration between 37.5 µs and 50 µs. A second duration of the data pulse may have a fixed value between 12.5 µs and 25 µs and can correspond to a second modulation symbol. Hence, the duration of a second pause corresponding to the second modulation symbol may have a fixed duration between 25 µs and 37.5 µs. A third duration of the data pulse may have a fixed value between 25 µs and 37.5 µs and can correspond to a third modulation symbol. A third pause corresponding to the third modulation symbol may then have a fixed duration between 12.5 µs and 25 µs. A fourth duration of the data pulse may have a fixed value between 37.5 µs and 50 µs and can correspond to a fourth modulation symbol. A fourth pause corresponding to the fourth modulation symbol may then have a fixed duration between 0 and 12.5 µs. Of course, in other examples also other durations of the pulse and the pause are possible for representing different and/or more modulation symbols.

According to some embodiments, the signal processing circuit can be configured to generate the data pulse with a maximum pulse width of at most 500 µs (or at most 300 µs, or at most 200 µs, or at most 100 µs, or at most 50 µs, or at most 40 µs, or at most 25 µs). Such maximum pulse widths may provide a reliable communication of the encoded WSS signal and make it robust against distortions. A longer maximum pulse width can allow a higher modulation order of the modulation scheme.

As described above, for distinguishing data pulses of variable width from speed pulses, the amplitude of the data pulses can be at least smaller than 95% (or smaller than 90%, or smaller than 80%, or smaller than 50%) of the amplitude of the speed pulses.

Furthermore, the signal processing circuit 222 can be configured to set the amplitude of the data pulse to at least two different levels and to set the width of the data pulse to at least two different durations. Different combinations of level and width can correspond to different modulation symbols of the modulation scheme. For example, two different levels of amplitude and two different durations of the data pulse can yield for different combinations that can represent four different modulation symbols.

Additionally, values of adjacent modulation symbols may differ by only one bit. This can improve the robustness of the encoded WSS signal provided by the output interface 224, for example, against noise and interference. A misinterpretation upon reception of a data pulse (for example at a signal decoder of an electronic control unit of a vehicle) may then lead to less bit errors. A symbol error having less bit errors may then be detected due to the parity bit optionally provided by the signal encoder.

For example, if there are four different levels of amplitude with a first level being smaller than a second level, the second level being smaller than a third, and the third level being smaller than a fourth level, a first modulation symbol corresponding to the first level is adjacent to a second modulation symbol corresponding to the second level. The second modulation symbol is additionally adjacent to a third modulation symbol corresponding to the third level, and the third modulation symbol is additionally adjacent to a fourth modulation symbol corresponding to the fourth level. In order to let the adjacent modulation symbols differ by only one bit, the signal encoder may assign the value "00" to the first modulation symbol, the value "01" to the second modulation symbol, the value "11" to the third modulation symbol, and the value "10" to the fourth modulation symbol. Within the scope of this dis-closure, the illustrated example may be transferred to a higher modulation order or to differently generated modulation symbols (e.g., to data pulses varying in width and/or to data pulses varying both in width and amplitude).

The signal encoder 200 may, for example, be implemented by an electric circuit. For example, the input interface 220 can comprise an analog-to-digital converter and an input shift register for receiving the (raw) WSS signal providing speed information and additional information. Moreover, the input interface 220 can comprise filtering, amplification, and/or equalization circuitry for signal processing of the received WSS signal. The signal processing circuit 222 can be integrated on a microcontroller, a field-programmable gate array, a digital signal processor, and/or an application specific integrated circuit. The signal processing circuit may also be implemented as program code executable on a central processing unit, for example. The output interface may comprise output shift registers, a digital-to-analog converter (e.g., a current output digital-to-analog converter) and/or amplification circuitry for sequentially outputting the first speed pulse, the data pulse(s), and the second speed pulse. Furthermore, the signal encoder 200 may also be integrated into a wheel speed sensor.

Figure 3A:
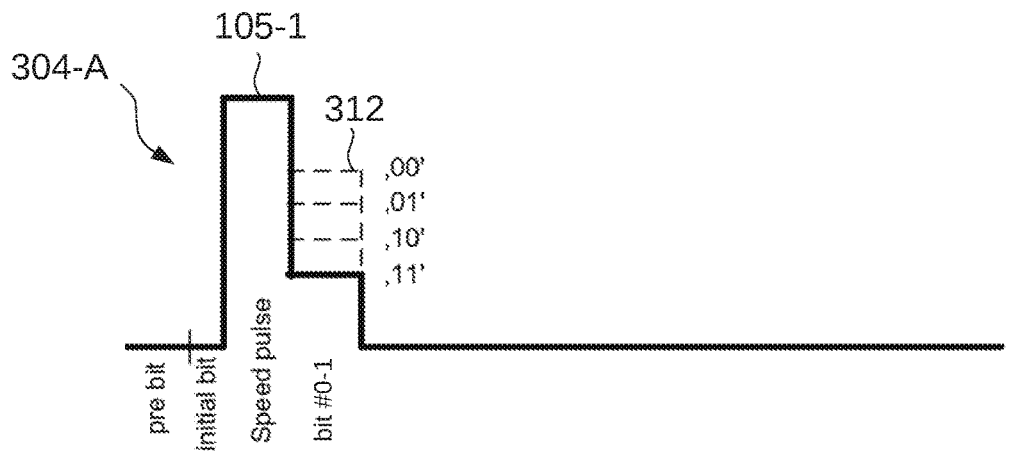
FIGS. 3A-3F show waveforms of encoded WSS signals with data pulses having at least three different levels of amplitude.

FIG. 3A shows a waveform of an encoded WSS signal 304-A. The encoded WSS signal can be provided by the signal encoder 200 of FIG. 2. The encoded WSS signal 304-A comprises a first speed pulse 105-1 and a data pulse 312 (and may comprise additional data pulses as well as a second speed pulse that are not shown). The amplitude of the data pulse 312 may take on four different levels that correspond to four different modulation symbols. Each modulation symbol may then represent different values of two bits (e.g., "00", "01", "10", or "11") of additional information carried by the encoded WSS signal 304-A. The data pulse 312 may thus comprise bit #0 and bit #1 of a binary word representing the additional information. As indicated in FIG. 3A, the data pulse 312 is generated without delay after the first speed pulse 105-1.

The modulation order may also be higher by introducing more amplitude levels of the data pulse (or data pulses). According to another embodiment, the modulation order is eight. Hence, each modulation symbol may represent a different value of three bits. For example, an amplitude of 19 mA of the data pulse 312 can correspond to the value "000". An amplitude of 17.5 mA can correspond to "001". An amplitude of 16 mA can correspond to "010". An amplitude of 14.5 mA can correspond to "011". An amplitude of 13 mA can correspond to "100". An amplitude of 11.5 mA can correspond to "101". An amplitude of 10 mA can correspond to "110", and an amplitude of 8.5 mA can correspond to the value "111". In this way, the additional information can be coded differently (e.g., different compared to a Manchester Code). For example, instead of using serial bit communication a multiple level current level after the speed pulse can be introduced as described in this example.

In this example, it is hence possible to deliver 3 bit of additional information up to a maxi-mum frequency of approximately 5 kHz (of the speed pulses) assuming a pulse width of 50 µs of the speed pulses and a pulse width of 50 µs of the data pulse. By delivering the protocol (e.g., the data pulse) only on each rising edge (e.g., of a raw WSS signal)

and not on every edge as is some ABS applications the 3 bit additional information can be available up to 10 kHz, which can be sufficient for many transmission applications. These three bits could contain the direction information (e.g., rotational direction information), and/or an error bit (e.g., validity of the rotational direction information) including additional information of the error (e.g., air gap reserve information).

Figure 3B:
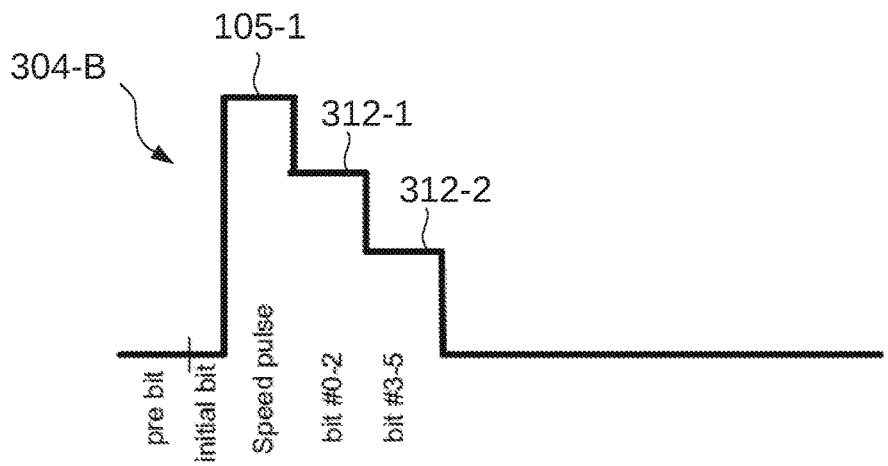
Figure 3C:
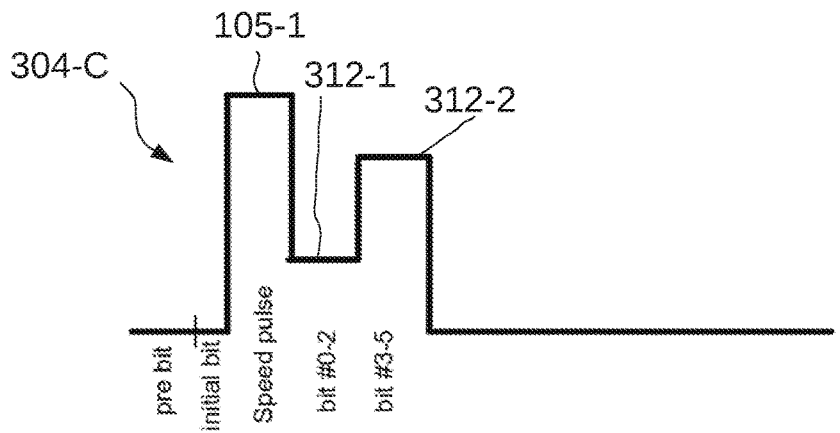

FIGS. 3B-3C show two example waveforms of encoded WSS signals 304-B, 304-C, respectively. The encoded WSS signals 304-B, 304-C can be provided by the signal encoder 200 of FIG. 2, for example. The encoded WSS signals 304-B, 304-C each comprise a first speed pulse 105-1 as well as and a first and second data pulse 312-1, 312-2 (and may comprise additional data pulses as well as a second speed pulse that are not shown).

For example, by adding the second data pulse 312-2 (or second information pulse), which can contain again 3 bits of the additional information, more than 3 bits can be delivered. The second data pulse 312-2 following the first data pulse 312-1 can be available up to a frequency of 5 kHz of the speed pulses pulse assuming a pulse width of 50 μs of the speed pulses and a pulse width of 50 μs of the data pulse.

Figure 3D:
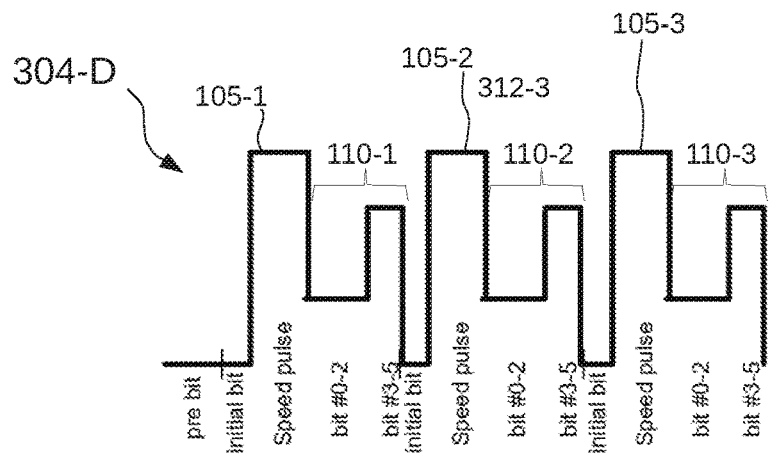

FIG. 3D shows another example waveform of an encoded WSS signal 304-D. The encoded WSS signal 304-D can be provided by the signal encoder 200 of FIG. 2, for example. Between two successive speed pulses a respective sequence 110-1, 110-2, 110-3 of two data pulses is generated. Each data pulse can carry three bits of additional information. For example, the first data pulse of the sequence can carry information bits #0-2, and the second data pulse of the sequence can carry information bits #3-5 of a binary word of six bits representing the additional information. However, because the time interval between two successive speed pulses is too short for fully generating the second data pulse without risking interference with the speed pulse following the second data pulse, the generation of the second data pulse is interrupted. For example, the signal processing circuit 222 of the signal encoder 200 of FIG. 2 can be configured to estimate and/or to predict the time interval between two successive speed pulses (e.g., the first speed pulse 105-1 and the second speed pulse 105-2). The signal processing circuit 222 can then adjust the number of data pulses generated between the two successive speed pulses by interrupting the generation of the data pulses. In the example of FIG. 3D, bit #0-2 can be fully transmitted (e.g., generated), bit #3-5 are interrupted due to the following speed pulse.

Figure 3E:
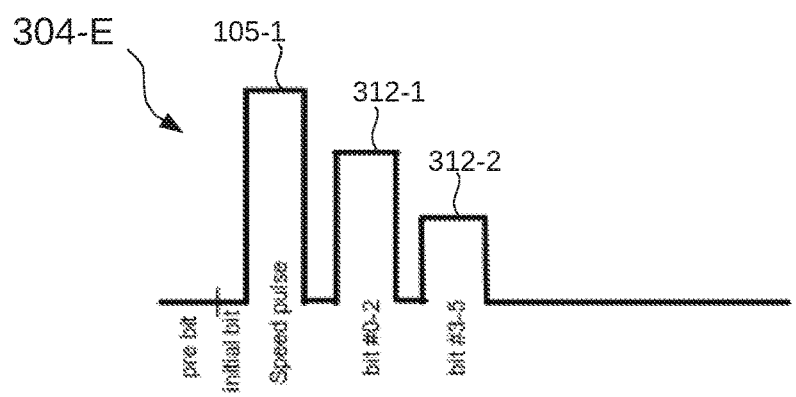

FIG. 3E shows yet another example waveform of an encoded WSS signal 304-E that can be provided by the signal encoder 200 of FIG. 2. In this example, a first speed pulse 105-1 is generated and followed by a pause interval of (approximately) half a pulse width of the speed pulse (or of a data pulse). Afterwards the first data pulse 312-1 is generated and the amplitude of the first data pulse is set according to the values of bit #0-2 of the binary word representing the additional information. After the generation of the first data pulse 312-1, the signal encoder introduces another pause interval of (approximately) half the pulse width of the speed pulse (or of a data pulse). The signal encoder then generates a second data pulse 312-2 and sets the amplitude of the second data pulse 312-2 according to the values of bit #3-5 of the binary word representing the additional information. The signal encoder may then introduce another pause interval before generating a second speed pulse.

Figure 3F:
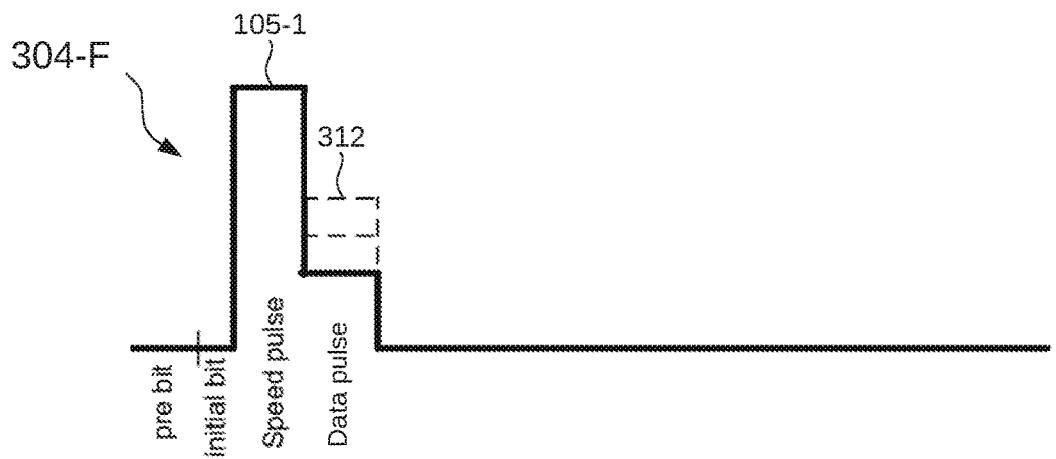

FIG. 3F shows a yet another example of a waveform of an encoded WSS signal 304-F. The encoded WSS signal 304-F can be provided by the signal encoder 200 of FIG. 2. The encoded WSS signal 304-F comprises a first speed pulse 105-1 and a data pulse 312. The amplitude of the data pulse 312 may take on three different levels so that the data pulse may carry 1.5 bits. In order to provide an integer number of bits, the WSS signal 304-F may comprise additional data pulses (not shown). For example, the WSS signal 304-F can comprise three data pulses. Because the amplitude of each data pulse may take on three different levels, the WSS signal 304-F may then take on 27 different waveforms (e.g., states). This can be sufficient for encoding four bits (which can take on 16 different values). Because the encoded WSS signal 304-F may use three data pulses for representing four bits, the number of data pulses can be reduced by one compared to a Manchester encoded WSS signal, for example. In another example, the WSS signal 304-F can comprise four data pulses with the amplitude of each data pulse being able to take on three different levels. This can allow 81 different waveforms and hence encoding 6 bits using four data pulses.

According to some embodiments, more or fewer current levels (e.g., amplitude levels for representing different modulation symbols) can be used. Furthermore, voltage interfaces (instead of current interfaces) may be employed. Furthermore, example signal encoders may be used to provide a standstill protocol (e.g., when an encoder wheel monitored by a wheel speed sensor connected to an example signal encoder is at rest) with the same or a similar definition. The information bits (e.g., the data pulses) may have a current level (e.g., amplitude) between the low level (e.g., 7 mA) and the high level (e.g., 28 mA) or within a different level (as levels used in protocols for WSS signal transmission in automotive vehicles). Furthermore, an additional initial bit (e.g., a pause interval) may be included between all the current levels (e.g., between successive data pulses that are generated between two successive speed pulses). Furthermore, variations of pulse width and pulse height can be combined to form different modulation symbols.

Figure 4A:
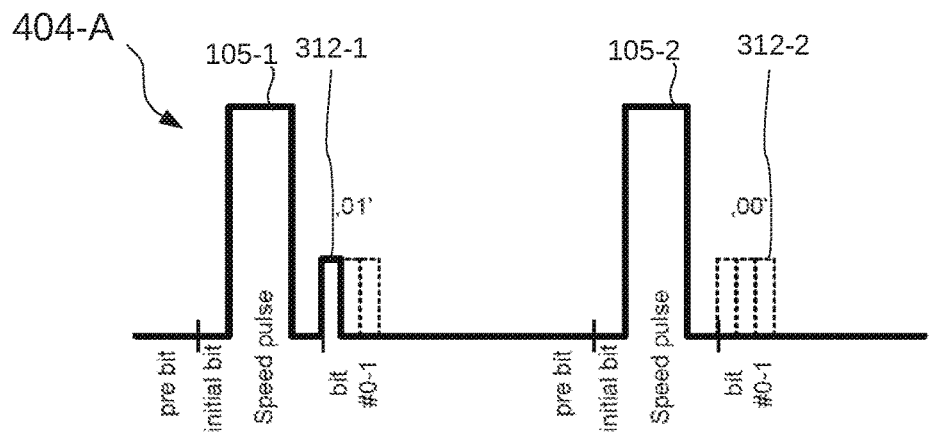
FIGS. 4A-4C show waveforms of encoded WSS signals with data pulses having at least three different durations.

FIG. 4A displays another example waveform of an encoded WSS signal 404-A that can be provided by the signal encoder 200 of FIG. 2. The encoded WSS signal 404-A comprises a first and a second speed pulse 105-1, 105-2 and a (first) data pulse 312-1 generated between the first and a second speed pulse 105-1, 105-2. Another second data pulse 312-2, which carries additional information that is updated with respect to the additional information carried by the first data pulse 312-1, is generated after the second speed pulse 105-2 and may be followed by a third speed pulse (not shown). In other words, the first and the second speed data 312-1, 312-2 may correspond to different readouts of additional information provided by a wheel speed sensor. For example, both the first and the second data pulse 312-1, 312-2 carry the first bit #0 and the second bit #1 of a binary word representing the additional information.

In the encoded WSS signal 404-A, the additional information is coded by changing the pulse width of the data pulses. The widths of the first and second data pulse 312-1, 312-2 are set to different durations, so that the first and the second data pulse 312-1, 312-2 correspond to different modulation symbols. In the example of the WSS signal 404-A, the width of the data pulses can be set to four different durations. For example, a data pulse shape that is for 45 μs at a high current level of say 14 mA, can represent a first modulation symbol, e.g., the logic value "11". Another data pulse shape that is for 30 μs at the high current and is followed by a pause of the low current level of say 7 mA and of say 15 μs duration can represent a second modulation symbol, e.g., the logic value "10". Yet another data pulse shape that is for 15 μs at a high current level and is followed by a pause of the low current level and of say 30 μs duration can represent a third modulation symbol, e.g., the logic value "01". Not raising the data pulse to the high current level and only generating a pause of the low current level of say 45 μs can represent a fourth modulation symbol, e.g., the logic value "00". In FIG. 4A, the first data pulse 312-1 has a duration corresponding to the third modulation symbol and carries hence the value "01". The second data pulse 312-2 has a duration corresponding to the fourth modulation symbol and carries hence the value "00".

FIG. 4A shows an example of a waveform having data pulses of different durations representing different modulation symbols of a modulation scheme with a modulation order of four. In other embodiments of this disclosure, the modulation order may also be equal to three, so that there may be three different durations of the data pulses, or may be higher (e.g., eight or sixteen) so that there may be correspondingly more different durations of the data pulses. Additionally, in other examples the current level during the high pulse may be different from 14 mA and the current level of the pause can also differ from 7 mA. Moreover, an output interface of a signal encoder providing the WSS signal 404-A may also realize the high and low levels by high and low voltages instead of high and low currents.

Figure 4B:
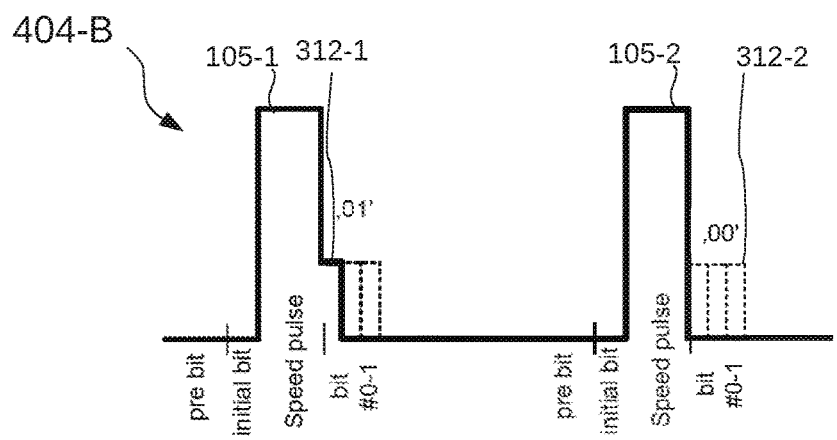

FIG. 4B shows yet another example waveform of an encoded WSS signal 404-B. The waveform of an encoded WSS signal 404-B may be similar to the waveform of the encoded WSS signal 404-A of FIG. 4A. While the encoded WSS signal 404-A comprises a respective pause interval between the first speed pulse 105-1 and the first data pulse 312-1 and between the second speed pulse 105-2 and the second data pulse 312-2, the first data pulse 312-1 of the encoded WSS signal 404-B is generated without delay after the first speed pulse 105-1 of the encoded WSS signal 404-B. Furthermore, the second data pulse 312-2 of the encoded WSS signal 404-B is generated without delay after the second speed pulse 105-2 of the encoded WSS signal 404-B. The encoded WSS signal 404-B may be provided by the signal encoder 200 of FIG. 2.

Figure 4C:
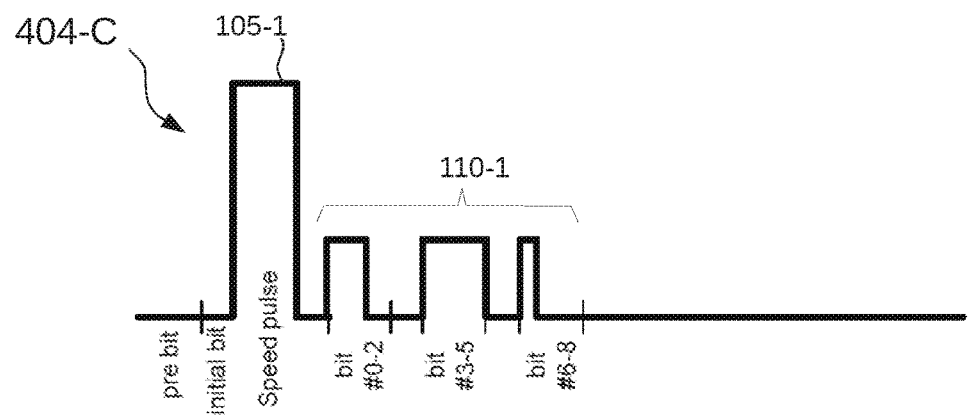

FIG. 4C shows yet another example waveform of an encoded WSS signal 404-C that can be provided by the signal encoder 200 of FIG. 2. In this example, a sequence 110-1 of data pulses is generated after a first speed pulse 105-1 and before a second speed pulse (not shown). Eight different durations of the data pulses can encode three bits of additional information within each data pulse. That is to say, the data pulses are generated in accordance with a modulation scheme having a modulation order of eight. In this way, a first data pulse of the sequence 110-1 can correspond to the first, second, and third bit (bit #0-2) of a binary word representing the additional information. Moreover, a second data pulse of the sequence 110-1 l can correspond to the fourth, fifth and sixth bit (bit #3-5) of the binary word, and a third data pulse to the seventh, eighth, and ninth bit (bit #6-8) of the binary word.

Figure 5:
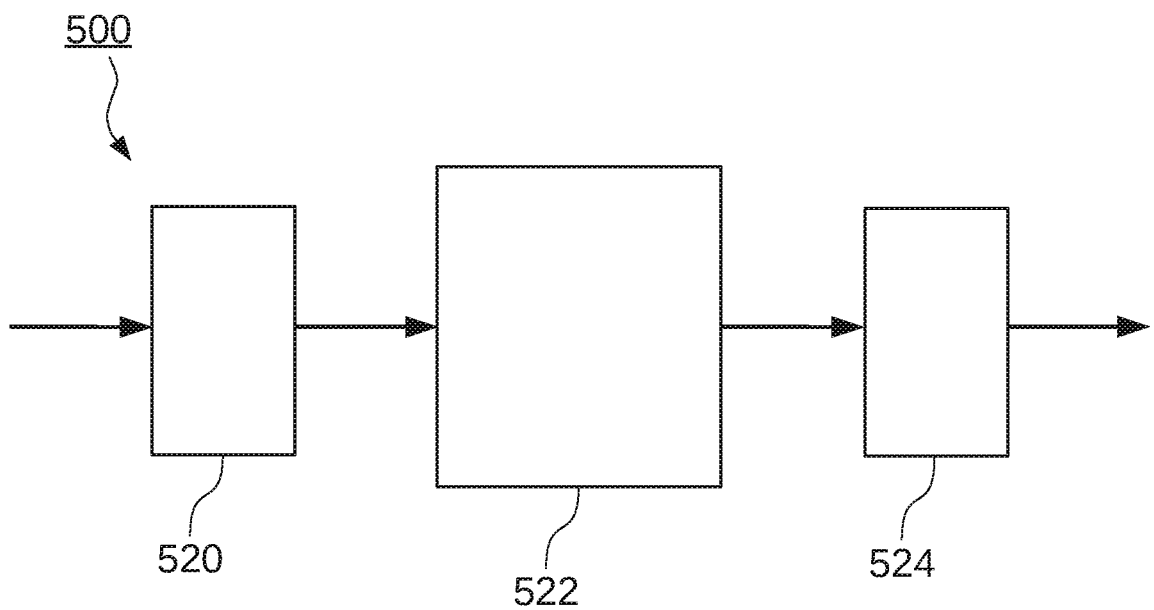
FIG. 5 shows a block diagram of a signal decoder for decoding a wheel speed sensor signal.

FIG. 5 shows a block diagram of a signal decoder 500 for decoding a wheel speed sensor signal. The signal decoder 500 comprises an input interface 520. The input interface 520 is configured to receive an encoded wheel speed sensor signal. The encoded wheel speed sensor signal provides speed information and additional information. Furthermore, the signal decoder 500 comprises a signal processing circuit 522. The signal processing circuit 522 is configured to determine the speed information based on a time interval between a first and a second speed pulse of the encoded wheel speed sensor signal. Additionally, the signal processing circuit 522 is configured to determine the additional information based on a data pulse received between the first and the second speed pulse. The determination of the additional information is in accordance with a modulation scheme of the data pulse having a modulation order of at least three. Furthermore, the signal decoder 500 comprises an output interface 524 configured to provide the decoded speed information and the decoded additional information.

The signal decoder 500 may enable determining additional information from a data pulse that has been generated in accordance with a modulation scheme having a modulation order of at least three. This may enable a robust communication of more additional information with a corresponding signal encoder (e.g., the signal encoder 200 of FIG. 2) than, for example, when using a Manchester encoded WSS signal.

For example, the signal processing circuit 522 of the signal decoder 500 can be configured to distinguish at least three different modulation symbols of the modulation scheme of the data pulse, each modulation symbol corresponding to a different value of the additional information (e.g., different values of the additional information). In this way, the signal processing circuit 522 may be configured to decode the additional information communicated by the encoded WSS signals 304-A, 304-B, 304-C, 304-D, 304-E, 304-F of FIGS. 3A-3F and the encoded WSS signals 404-A, 404-B, and 404-C of FIGS. 4A-4C. By distinguishing at least three (e.g., three, four, eight, or sixteen) different modulation symbols, the signal decoder 500 can decode data pulses of a modulation order higher than two and carrying a higher amount of data (e.g., more than one bit of a binary word corresponding to the additional information).

For example, the signal processing circuit 522 of the signal decoder 500 can be configured to distinguish at least three (e.g., three, four, eight, or sixteen) different durations of the data pulse (or of data pulses of a sequence of data pulses). Each duration can corresponds to a different value of the additional information (e.g., to a different modulation symbol of the modulation scheme). By distinguishing at least three different durations, the signal processing circuit 522 can decode more than one bit from a modulation symbol of a data pulse.

In some embodiments, the signal processing circuit 522 of the signal decoder 500 can be configured to distinguish at least three (e.g., three, four, eight, or sixteen) different levels of amplitudes of the data pulse (or of data pulses of a sequence of data pulses). Each level can corresponds to a different value of the additional information (e.g., to a different modulation symbol of the modulation scheme). By distinguishing at least three different levels of amplitude, the signal processing circuit 522 can decode more than one bit from a modulation symbol of a data pulse.

Moreover, the signal processing circuit 522 of the signal decoder 500 can be configured to distinguish different combinations of at least two different levels of amplitude and at least two different durations of the data pulse (or of data pulses of a sequence of data pulses). Each combination can corresponds to a different value of the additional information (e.g., to a different modulation symbol of the modulation scheme). By distinguishing at least four different combinations, the signal processing circuit 522 can relate different modulation symbols to different binary values of at least two bit carried by a data pulse.

Furthermore, the signal processing circuit 522 of the signal decoder 500 can be configured to distinguish speed pulses from data pulses by a difference in amplitudes of the speed and data pulses. For example, the signal processing circuit 522 can be configured to compare the amplitudes of a received sequence of pulses. Pulses having a maximal amplitude of the received sequence of pulses can be recognized as speed pulses by the signal processing circuit 522. Pulses having an amplitude smaller than 95% (or smaller than 90%, or smaller than 80%, or smaller than 50%) of the maximal amplitude of the received sequence of pulses can be recognized as data pulses by the signal processing circuit 522, for example.

The signal decoder 500 may, for example, be implemented by an electric circuit. For example, the input interface 520 can comprise an analog-to-digital converter and an input shift register for receiving the encoded WSS signal providing speed information and additional information. Moreover, the input interface 520 can comprise filtering, amplification, and/or equalization circuitry for signal processing of the encoded WSS signal. The signal processing circuit 522 can be integrated on a microcontroller, a field-programmable gate array, a digital signal processor, and/or an application specific integrated circuit. The signal processing circuit 522 may also be implemented as program code executable on a central processing unit, for example. The output interface 524 may comprise output shift registers for outputting the decoded speed information and the decoded additional information. For example, the output interface 524 may be configured to provide the decoded speed information and the decoded additional information as a bit stream in serial (e.g., at one output port) or in parallel (e.g., at a plurality of output ports). Furthermore, the signal decoder 500 may be integrated into an electronic control unit of an automotive vehicle.

Moreover, some embodiments relate to a communication system comprising the signal encoder 200 of FIG. 2 and the signal decoder 500 of FIG. 5.

Figure 6:
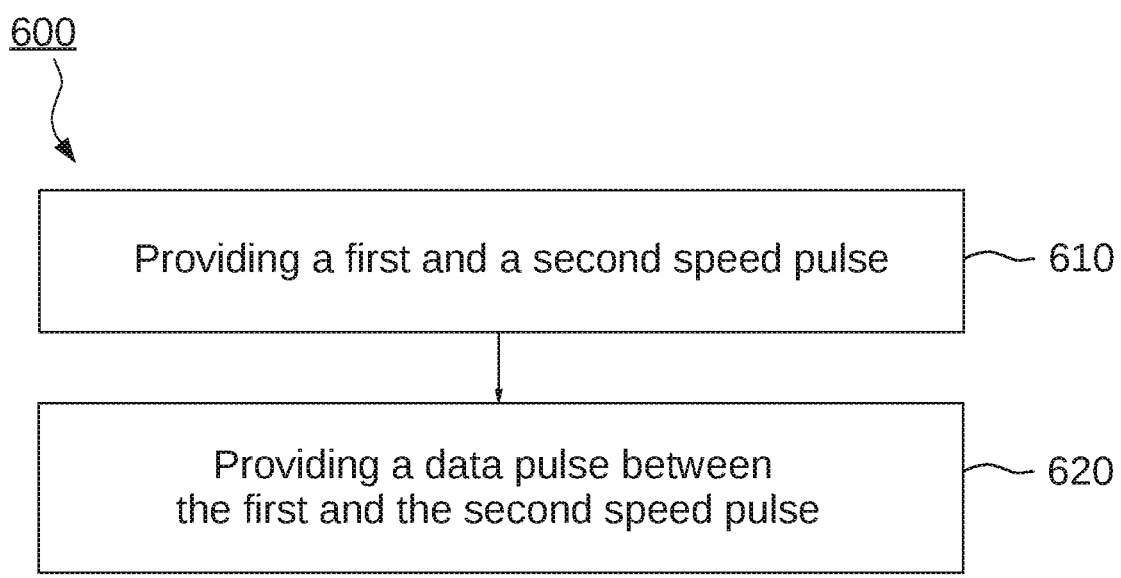
FIG. 6 shows a flow chart of a method for communicating an encoded WSS signal.

FIG. 6 shows a flow chart of a method 600 for communicating an encoded wheel speed sensor signal. The method 600 comprises providing 610 a first and a second speed pulse. A time interval between the first and the second speed pulse corresponds to speed information of a wheel speed sensor. Furthermore, the method 600 comprises providing 620 a data pulse between the first and the second speed pulse in accordance with a modulation scheme having a modulation order of at least three. The data pulse is based on additional information of the wheel speed sensor.

By providing the data pulse in accordance with a modulation scheme having a modulation order of at least three, a higher amount of the additional information (e.g., more than one bit) may be carried by the data pulse. In this way, a total number of data pulses generated between the first and the second speed pulse can be reduced. For example, it may be sufficient to provide one data pulse that carries the whole additional information, or at least a total number of data pulses generated between the first and the second speed pulse can be reduced (e.g., compared to a Manchester encoded WSS signal, whose data pulses can only carry one bit each). As there can be less data pulses, the time interval between the first and the second speed pulse can be smaller without causing interference between the second speed pulse and the data pulse (or a data pulse of a sequence of data pulses generated between the first and the second speed pulse). Hence, the data rate of the additional information can be maintained and/or increased while providing a reliable communication of the speed and additional information.

The modulation order can be determined by the number of different symbols of the modulation scheme. For example, a modulation order of m=3 corresponds to a modulation scheme comprising 3 different symbols, so that data pulses generated in accordance with this modulation scheme can have three different pulse shapes.

Providing 620 the data pulse can comprise communicating a data pulse with a pulse shape corresponding to a value of more than one bit of the additional information. For example, the data pulse can be provided having at least three different pulse shapes, each pulse shape corresponding to a different modulation symbol of the modulation scheme. With at least three (e.g., three, four, eight, or sixteen) different modulation symbols, more than one bit can be carried by the data pulse.

For example, providing 620 the data pulse can comprise setting the width of the data pulse to at least three different durations. Each duration can then correspond to a different modulation symbol of the modulation scheme. In this way, modulation symbols encoding more than one bit can be provided.

According to the method 600, firstly the first speed pulse can be provided. Next the data pulse (and/or a plurality of data pulses) can be provided and afterwards the second speed pulse. The method 600 may be used at a signal encoder (e.g., the signal encoder 200 of FIG. 2) and/or a signal decoder (e.g., the signal decoder 500 of FIG. 5). At a signal encoder, providing 610 the first and the second speed pulse can comprise generating the first and the second speed pulse and providing 620 the data pulse can comprise generating the data pulse. At a signal decoder, providing 610 the first and the second speed pulse can comprise receiving the first and the second speed pulse and providing 620 the data pulse can comprise receiving the data pulse.

According to another aspect of the present disclosure, it is provided a transmission of data (e.g., of additional information of a wheel speed sensor) as a multi-bit pulse. An embodiment relates to a protocol for higher magnetic frequencies. Other examples relate to functional safety requirements in transmission applications that are claiming to transmit the speed information of the rotation wheel including also additional information. This additional information might be the temperature information of the sensor, some error bits, amplitude information of the rotation wheel etc. Yet other examples may use higher data rates (e.g., a higher frequency of Manchester encoded WSS signals). However electromagnetic compatibility (EMC) requirements and long cable distances can show that this solution may require additional efforts in the application.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for per-forming one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A signal encoder for encoding a wheel speed sensor signal, the signal encoder comprising:
    an input interface configured to receive a wheel speed sensor signal providing speed information and other information;
    a signal processing circuit configured to:
        generate a first speed pulse and a second speed pulse, wherein a time interval between the first speed pulse and the second speed pulse corresponds to the speed information,
        generate, based on the other information, a data pulse between the first speed pulse and the second speed pulse in accordance with a modulation scheme having a modulation order of at least three, and
        set an amplitude of the data pulse to one of at least three different levels,
            wherein each level, of the at least three different levels, corresponds to a different modulation symbol of the modulation scheme; and
    an output interface configured to sequentially output the first speed pulse, the data pulse, and the second speed pulse.

2. The signal encoder of claim 1, wherein the signal processing circuit is configured to provide at most one rising edge and at most one falling edge to the data pulse.

3. The signal encoder of claim 1, wherein the signal processing circuit is configured to generate the data pulse without delay after the first speed pulse.

4. The signal encoder of claim 1, wherein the signal processing circuit is configured to represent the other information as a binary word of at least two bits.

5. The signal encoder of claim 4, wherein the signal processing circuit is configured to generate the data pulse with a pulse shape corresponding to a value of more than one bit of the binary word.

6. The signal encoder of claim 4, wherein the signal processing circuit is configured to generate a plurality of data pulses between the first speed pulse and the second speed pulse,
    wherein each data pulse, of the plurality of data pulses, carries at least more than one bit of the binary word.

7. The signal encoder of claim 6, wherein the signal processing circuit is configured to adjust a quantity of the plurality of data pulses generated between the first speed pulse and the second speed pulse according to the time interval between the first speed pulse and the second speed pulse.

8. The signal encoder of claim 6, wherein the signal processing circuit is configured to introduce a pause interval between two successive data pulses of the plurality of data pulses.

9. The signal encoder of claim 1, wherein the signal processing circuit is configured to set a width of the data pulse to at least three different durations, wherein each duration, of the at least three different durations, corresponds to a different modulation symbol of the modulation scheme.

10. The signal encoder of claim 1, wherein the signal processing circuit is configured to set a width of the data pulse to at least two different durations,
wherein different combinations of the at least two three different levels and the at least two different durations correspond to different modulation symbols of the modulation scheme.

11. The signal encoder of claim 10, wherein values of adjacent modulation symbols, of the different modulation symbols, differ by only one bit.

12. The signal encoder of claim 1, wherein the signal processing circuit is configured to set an amplitude of the first speed pulse and the second speed pulse to a fixed level and to set the amplitude of the data pulse to a level at least smaller than 95% of the amplitude of the first speed pulse and the second speed pulse.

13. The signal encoder of claim 1, wherein the signal processing circuit is configured to generate the data pulse with a maximum pulse width of at most 500 µs.

14. A signal decoder for decoding a wheel speed sensor signal, the signal decoder comprising:
an input interface configured to receive an encoded wheel speed sensor signal providing speed information and other information;
a signal processing circuit configured to:
determine the speed information based on a time interval between a first speed pulse and a second speed pulse of the encoded wheel speed sensor signal, and
determine the other information based on a data pulse received between the first speed pulse and the second speed pulse in accordance with a modulation scheme of the data pulse having a modulation order of at least three,
wherein an amplitude of the data pulse is set to one of at least three different levels, and
wherein each level, of the at least three different levels, corresponds to a different modulation symbol of the modulation scheme; and
an output interface configured to provide the speed information and the additional other information.

15. The signal decoder of claim 14, wherein the signal processing circuit is configured to distinguish at least three different modulation symbols of the modulation scheme,
wherein each modulation symbol, of the at least three different modulation symbols, corresponds to a different value of the other information.

16. The signal decoder of claim 14, wherein the signal processing circuit is configured to distinguish at least three different durations of the data pulse,
wherein each duration, of the at least three different durations, corresponds to a different value of the other information.

17. A method for communicating an encoded wheel speed sensor signal, the method comprising:
providing a first speed pulse and a second speed pulse,
wherein a time interval between the first speed pulse and the second speed pulse corresponds to speed information of a wheel speed sensor; and
providing a data pulse between the first speed pulse and the second speed pulse in accordance with a modulation scheme having a modulation order of at least three,
wherein the data pulse is based on other information of the wheel speed sensor,
wherein a width of the data pulse is set to one of at least three different durations, and
wherein each duration, of the at least three different durations, corresponds to a different modulation symbol of the modulation scheme.

18. The method of claim 17, wherein providing the data pulse comprises communicating a data pulse with a pulse shape corresponding to a value of more than one bit of the other information.

19. The method of claim 17, wherein a variable pause follows or precedes the data pulse.

20. The method of claim 17, wherein an amplitude of the data pulse is set to one of at least two different levels, and
wherein each level, of the at least two different levels, corresponds to a different modulation symbol of the modulation scheme.

* * * * *

UNITED STATES PATENT AND TRADEMARK OFFICE
CERTIFICATE OF CORRECTION

PATENT NO. : 11,049,387 B2  
APPLICATION NO. : 15/844672  
DATED : June 29, 2021  
INVENTOR(S) : Simon Hainz et al.

Page 1 of 1

It is certified that error appears in the above-identified patent and that said Letters Patent is hereby corrected as shown below:

In the Claims

Claim 10:
Column 19, Line 7, change "wherein different combinations of the at least two three" to -- wherein different combinations of the at least three --

Claim 14:
Column 20, Line 2, change "mation and the additional other information." to -- mation and the other information. --

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*